(12) United States Patent
Panchaksharaiah et al.

(10) Patent No.: US 12,170,808 B2
(45) Date of Patent: Dec. 17, 2024

(54) SYSTEMS AND METHODS FOR GENERATING A NOTIFICATION IN RESPONSE TO A LIVE BROADCAST

(71) Applicant: Adeia Guides Inc., San Jose, CA (US)

(72) Inventors: Vishwas Sharadanagar Panchaksharaiah, Karnataka (IN); Vikram Makam Gupta, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/524,863

(22) Filed: Nov. 12, 2021

(65) Prior Publication Data

US 2023/0156269 A1  May 18, 2023

(51) Int. Cl.
*H04N 21/435* (2011.01)
*G06V 40/16* (2022.01)
*H04N 21/4415* (2011.01)

(52) U.S. Cl.
CPC ....... *H04N 21/435* (2013.01); *H04N 21/4415* (2013.01); *G06V 40/16* (2022.01)

(58) Field of Classification Search
None
See application file for complete search history.

(56) References Cited

U.S. PATENT DOCUMENTS

| | | | |
|---|---|---|---|
| 9,621,505 B1 * | 4/2017 | Ko | G06V 20/30 |
| 10,654,942 B2 * | 5/2020 | Resnick | C07K 16/18 |
| 11,151,481 B1 * | 10/2021 | Sun | G06V 40/161 |
| 2010/0173616 A1 * | 7/2010 | Romano | H04N 21/47 455/414.1 |
| 2014/0129266 A1 * | 5/2014 | Perl | G06Q 30/02 705/5 |
| 2014/0250175 A1 * | 9/2014 | Baldwin | H04L 67/306 709/204 |
| 2019/0075341 A1 * | 3/2019 | Koul | H04N 21/44008 |
| 2022/0122639 A1 * | 4/2022 | Townsend | H04N 9/79 |

FOREIGN PATENT DOCUMENTS

WO  WO-2013074233 A1 *  5/2013  ......... G06K 9/00228

* cited by examiner

*Primary Examiner* — James R Marandi
(74) *Attorney, Agent, or Firm* — Haley Guiliano LLP (57) ABSTRACT

Systems and methods are provided for generating a notification in response to identifying a user in a capture of an event. A link between a user and an event is generated and a capture of the event is received at a first computing device. The user in the capture of the event is identified at the computing device and based on the link. A notification is generated based on identifying the user. The notification is transmitted to a second computing device.

18 Claims, 10 Drawing Sheets

SYSTEMS AND METHODS FOR GENERATING A NOTIFICATION IN RESPONSE TO A LIVE BROADCAST

BACKGROUND

The present disclosure is directed towards systems and methods for generating a notification in response to identifying a user in a capture of an event. In particular, systems and methods are provided herein for generating a notification in response to identifying a user in a capture of an event, wherein the user is identified based on a generated link between the user and an event.

SUMMARY

With the proliferation of smart devices, such as smart phones and smart televisions, users have become accustomed to receiving notifications via a user interface of their smart device with respect to many different aspects of their life. For example, notifications can be generated and displayed via a user interface to indicate that a user has received a message via a messaging application, that an ordered takeout is about to be delivered, and/or that a user has not walked enough steps to meet a target amount of steps in a day. Users may wish to receive an additional type of notification, via a user interface of a computing device, that indicates when someone they know is present in a live broadcast of an event, such as a football game and/or a concert. However, it is not straightforward to identify a person in a live broadcast and subsequently generate a notification, via a user interface of a computing device. In addition, as live broadcast is typically made up from feeds from a plurality of image capture devices at an event (i.e., more material is captured than is broadcast), and the broadcast itself may typically comprise many individual frames, there is a need to identify a person in a manner that uses computer processing resources in an efficient manner.

In view of the foregoing, it would be beneficial to have a system that is capable of generating a notification in response to identifying a user in a capture of an event.

Systems and methods are described herein for generating a notification in response to identifying a user in a capture of an event. In accordance with some aspects of the disclosure, a method for generating a notification in response to identifying a user in a capture of an event. A link between a user and an event is generated, and, at a first computing device, a capture of the event is received. The user is identified in the capture of the event, at the computing device and based on the link. A notification is generated based on the identified user, and the notification is transmitted to a second computing device. The event may start at a first time and the link may be generated before the first time. The event may be a televised event, and the user may be a spectator at the event that is being televised. Generating the link may further comprise receiving a request for a ticket for the event, and receiving a photo associated with the user. The capture may comprise a plurality of frames. Identifying the user may further comprise identifying the user via facial recognition, wherein the identifying the user via facial recognition may comprise a number of steps. These steps may comprise identifying, in the received photo, a first face; identifying, in a frame of the capture, a second face; and comparing, at the first computing device, the first face and the second face. The user may be identified via biometric recognition.

In an example system, a user books a ticket for an event, such as a football game, via, for example, a website on a computing device, such as a smartphone. At the time of booking the ticket, the user provides a photo of their face and a number of people to notify if the user is included in a part of a broadcast of the event, and this data is uploaded, from their smartphone, to a server. At a later time, the user attends the event, a video camera captures the event, and the capture is transmitted to a computing device, such as the server. At the server, the frames of the capture are analyzed to identify the user via, for example, the photo that they provided when booking the ticket. In this example system, the identification includes comparing the face identified in the photo to face(s) identified in the capture of the broadcast, or comparing a face identified in the capture of the broadcast to the received photo(s). On identifying the user, a notification is generated and transmitted to computing devices associated with people indicated at the time of booking the ticket.

Generating the link may further comprise identifying, in the received photo, an object associated with a low occurrence threshold. Identifying the user may be further based on the object identified in the received photo. In an example system, the user provides a photo of themselves including an object. This photo may be provided when the user attends the event, for example at an entrance of the event. The photo of the user may be linked with, for example, the user via a quick response (QR) code on their ticket for the event. A low occurrence threshold indicates that few people are likely to have that object at the event. For example, the user may be wearing a unique hat, or have a large banner with them. When the captures of the event are subsequently analyzed to identify the user, the object may be used to either identify the user or increase a confidence level associated with, for example, a facial recognition match. For example, if a unique hat is identified in the capture, then the face associated with the unique hat may only be compared to those received photos that are also associated with the unique hat. In this way, as fewer photos need to be analyzed for the comparison, the computer processing power associated with making a facial recognition match may be decreased. In another example, if the facial recognition match was initially a match with a 60% confidence level, but it was identified that the user was wearing a unique hat that was captured at the entrance of the event, the confidence level may be increased to, for example, 85%.

Generating the link may further comprise identifying an area, in the event, where the user is likely to be located. The user may be identified based on an identified area. For example, a seat number may be associated with a user via, for example, a ticket to the event that they have purchased. For example, a capture may comprise a plurality of known seat numbers. In this example, only the photos associated with those seat numbers are used for comparison with the identified faces in the capture. In this way, as fewer photos need to be analyzed for comparison, the computer processing power associated with making a facial recognition match may be decreased.

Generating the link may further comprise generating a link between the user and a group of people at the event. Identifying the user may further comprise identifying the user in the capture with a low confidence level; identifying one or more people of the group of people; and identifying a proximity of the one or more people of the group to the user. The confidence level associated with the user may be revised based on the proximity of the one or more people of the group of people to the user. In an example system, when a user attends an event, they may be associated with people who are attending the event with them by, for example, a photo of the user and associated people being taken at an entrance of the event. If a facial recognition match of the user was initially a match with a 65% confidence level, but it was identified that the user was proximate one of the other members of the group, the confidence level may be increased to, for example, 75%.

The capture of the event may be a first capture. The first computing device may receive a plurality of captures of the event. For each capture in the plurality of captures, it may be identified whether the received capture comprises a capture that is, or is about to be, broadcast. Identifying the user in the capture in the event may only be carried out for captures that are, or are about to be, broadcast. For example, there may be three video cameras taking captures of the event, each of the video cameras providing a live feed of the event. An editor may choose which of the feeds to broadcast at a certain time. As such, there is no need to analyze the feeds of the, for example, two feeds that are not being used for the live broadcast for facial recognition matches. Only the feed that is about to be broadcast may be analyzed for facial recognition matches.

Generating the link between a user and event may further comprise identifying a personal identification token associated with the user. Identifying the user may be further based on identifying the personal identification token associated with the user. For example, the user may have a QR code associated with them, a near-field communication (NFC) device associated with them and/or a Wi-Fi-enabled device (e.g., via a media access control (MAC) address) associated with them. These may be associated with a user via, for example, a computing device that is present at an entrance of the event. During the broadcast of the event, for example, a general direction of a video camera may be identified and the people within the view of the video camera may be identified via the QR code, NFC device and/or Wi-Fi-enabled device, to enable a subset of, for example, originally provided photos of the people to be used to identify a user (or users) in the capture. In this way the amount of computer processing power required to identify a user in a capture may be reduced.

The capture may be received at the first computing device at a first time, and the capture may be broadcast at a second time, wherein the first time is before the second time. For example, the event may be captured at a video camera and transmitted to a server. At the server, a delay of, for example, five, 15, 20, or 30 seconds may be introduced before the capture is broadcast. During this delay, the captures may be analyzed to identify one or more users, generate a notification and transmit the notification to one or more secondary computing devices.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Systems and methods are described herein for generating a notification in response to identifying a user in a capture of an event. An event is a broad term that covers any type of event that may be captured and broadcast. It includes sporting events, such as a live football game or an e-sport event, such as "Overwatch," music events, such as a live performance, nature programs and gameshows, such as "Jeopardy!"

Capturing an event, such as a sport, may take place by any capture device, such as a video camera that captures an event and/or a computing device that captures an e-sport for broadcast. In some examples, capturing an event may comprise using one or more video cameras and/or capture devices. In some examples, a plurality of different capture devices may be utilized to capture an event. Where a single capture device, such as a video camera, is referred to, it is also contemplated that multiple captures devices may be utilized. A capture of an event may be recorded in an audiovisual file. An audiovisual file is any data file that enables a captured event to be replayed at a computing device. For example, it includes MPEG-1, MPEG-2, MPEG- 4, AVI, MOV, AVCHD, H.264, H.265, DivX, DivX HD, Xvid HD, MKV, RMVB, WMV9, TS/TP/M2T, WMV, FLV and/or MP4.

A link is anything that can be generated to connect a user to an event. Typically, a link may be generated when a user purchases a ticket for an event. In another example, a link may be created as a user enters an entrance of an event and biometric data of the user, including, for example, a photo of a user's face, is captured. In some examples, the link may be generated via an identification token associated with user, for example, a QR code, an NFC device and/or a Wi-Fi device associated with the user. In some examples, after an initial link is generated, further information may be associated with the user. This further information may be, for example, gathered via a social media profile associated with the user. For example, a user may provide social media information when ordering a ticket and may enable the ticketing provider to access their social media account. In other examples, a user may order a ticket via a media application running on a computing device, for example an over-the-top (OTT) provider of media content. The user may be associated with the OTT media application, and the link may be generated based on that association.

A notification may be a visual notification and/or an audible notification. The notification may be generated at a first computing device, such as a server, and transmitted to a second computing device, such as smartphone, where it is output. In other examples, the server may only transmit key data items to the smartphone, and the smartphone may generate a notification based on the key data items, in some examples, using the key data items to fill blanks in a pre-defined form. In other examples, the notification may not be output at the second computing device at all; rather, it may be used to indicate that an action should be performed at the second computing device. The notification may comprise data indicating the action that should be performed. In other examples, the computer may determine the action to perform based on the received notification.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
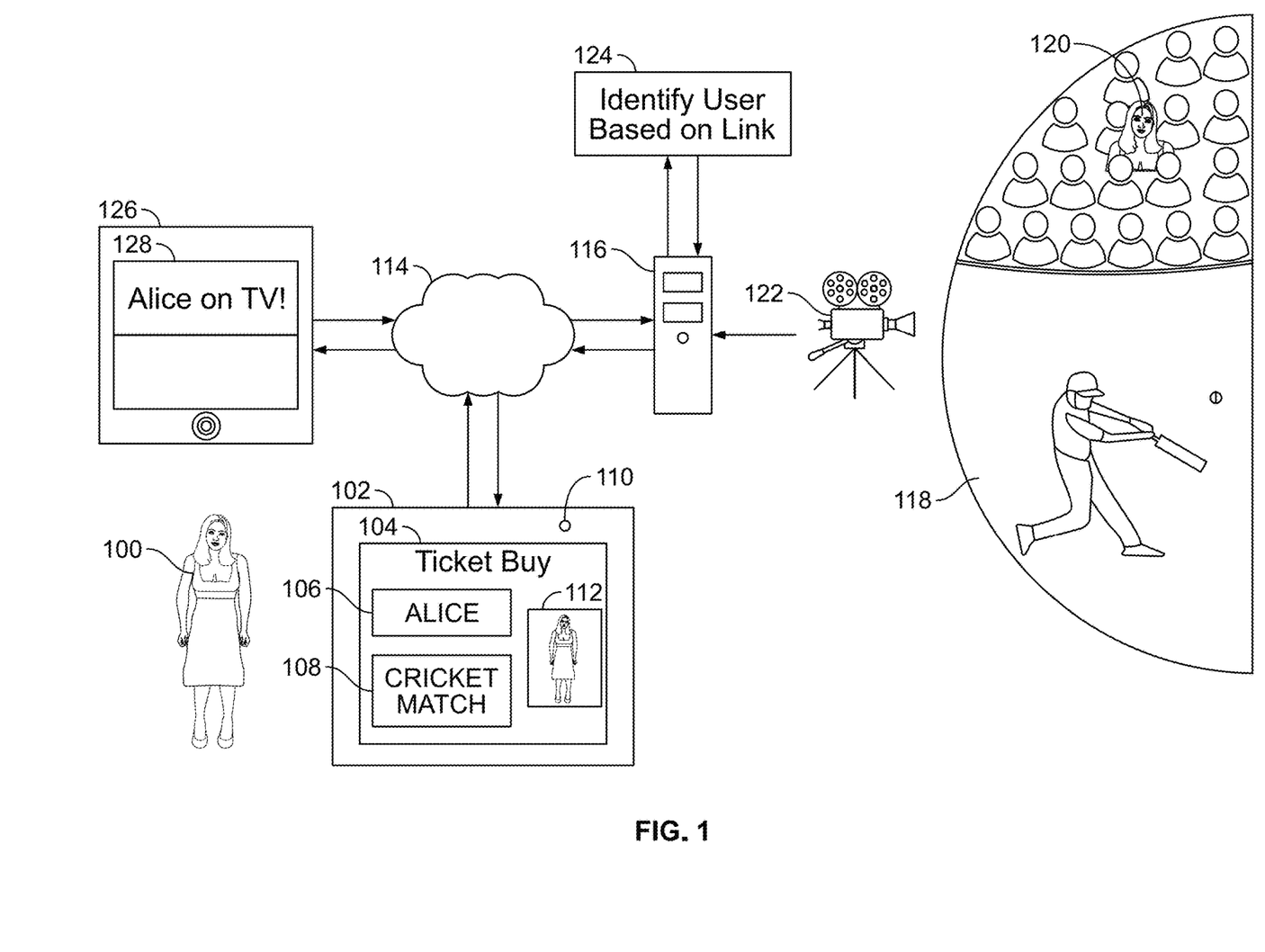
FIG. 1 shows an example environment in which a notification is generated in response to identifying a user in a capture of an event, in accordance with some embodiments of the disclosure.

FIG. 1 shows an example environment in which a notification is generated in response to identifying a user in a capture of an event, in accordance with some embodiments of the disclosure. The environment comprises a user 100, a computing device, such as a tablet 102, a network 114, a second computing device, such as a server 116, an event 118, an image capture device, such as video camera 122 and a third computing device, such as smartphone 126. The user 100 uses the tablet 102 to visit a website 104, or application, to purchase a ticket for an event. In this example, the user inputs user details, such as their name 106 and the event that they would like to attend 108, in this example, a cricket match. In addition, the user may identify one or more computing devices to receive a notification if they are about to be (or are) present in a broadcast, such as a live broadcast, of the event. The user may, for example, enter a phone number associated with a computing device, so that a message can be sent to the computing device. In another example, the user may enter a username associated with a social media profile, so that a notification can be generated for display via a social media application running on a computing device. In another example, a user may, for example, purchase a ticket via an application running on a smart television, or a set-top box (STB). In this example, an identifier of the smart television may be indicated at the time the ticket is purchased. In another example, a soft TiVo serial number associated with a STB may be indicated. Notifications can be displayed via the smart television for, for example, family members who are watching the event at home.

The user 100 also uses a camera 110 of the tablet 102 to take a photo 112 of themself. In other examples, the user may not use a camera of the tablet 102 to provide the photo 112; they may select a photo 112 stored on a memory of the tablet 102. In another example, the user 100 may select a photo 112 via a social media network. The user data 106, event data 108 and the photo 112 are transmitted from the tablet 102, via the network 114, such as the internet, to the server 116. The network 114 may comprise wired and/or wireless means for transmitting the request to the server 116. The user 100 attends the event 118 and sits in a spectator area 120. An image capture device, such as video camera 122, captures the event, and a capture of the event is transmitted, in this example, to the server 116. The capture of the event is also broadcast via, for example, a cable network to multiple computing devices, such as televisions. In some examples, a delay of, for example, five, 15, 20, or 30 seconds may be introduced before the capture is broadcast. During this delay, the capture may be analyzed at the server 116, where it is identified 124 whether the user 100 is present in the capture, based on the information provided at the time of purchasing the ticket, such as, in this example, the photo 112. This process may be carried out for every user who provides data that may be used to identify them when creating a link between themselves and the event by, for example, purchasing a ticket to the event. The amount of computer processing power required to identify a user in the crowd is reduced, because the crowd is only being analyzed to identify users who have generated a link between themselves and the event.

On identifying the user 100, a notification is generated at the server 116 and is transmitted, via the network 114, to a third computing device, such as the smartphone 126, that was identified, for example, at the time a ticket to the event was purchased. At the smartphone, notification is generated for display, and the notification 128 is displayed. The notification may include text indicating the user, in this example "Alice," and that they can be seen in, for example, a live broadcast. In some examples, the notification may include information about the event, such as a name of the event, and a channel on which the event can be seen. In other examples, one or more actions may be performed in response to receiving the notification. In these examples, the notification may not be generated for display. For example, a smart television may be automatically switched to a channel showing the event. In other examples, a recording of the channel on which the event is being broadcast may be initialized at the third computing device. In other examples, a recording may be initialized at a server and may be stored in the cloud, in a manner such that it is accessible via the first and third computing devices. In some examples, the recording may be transmitted to the first computing device, such that the user can, for example, upload the recording of themselves to a social media network. In this example, the same server receives the user data 106, receives the event data 108, receives the photo 112, receives the capture of the event, performs the identification 124 of the user in the capture and transmits the notification 128; however, any of the steps may be carried out at one or more other servers. These other servers may be different physical servers, virtual machines running on the same server and/or a combination of the two.

Figure 2:
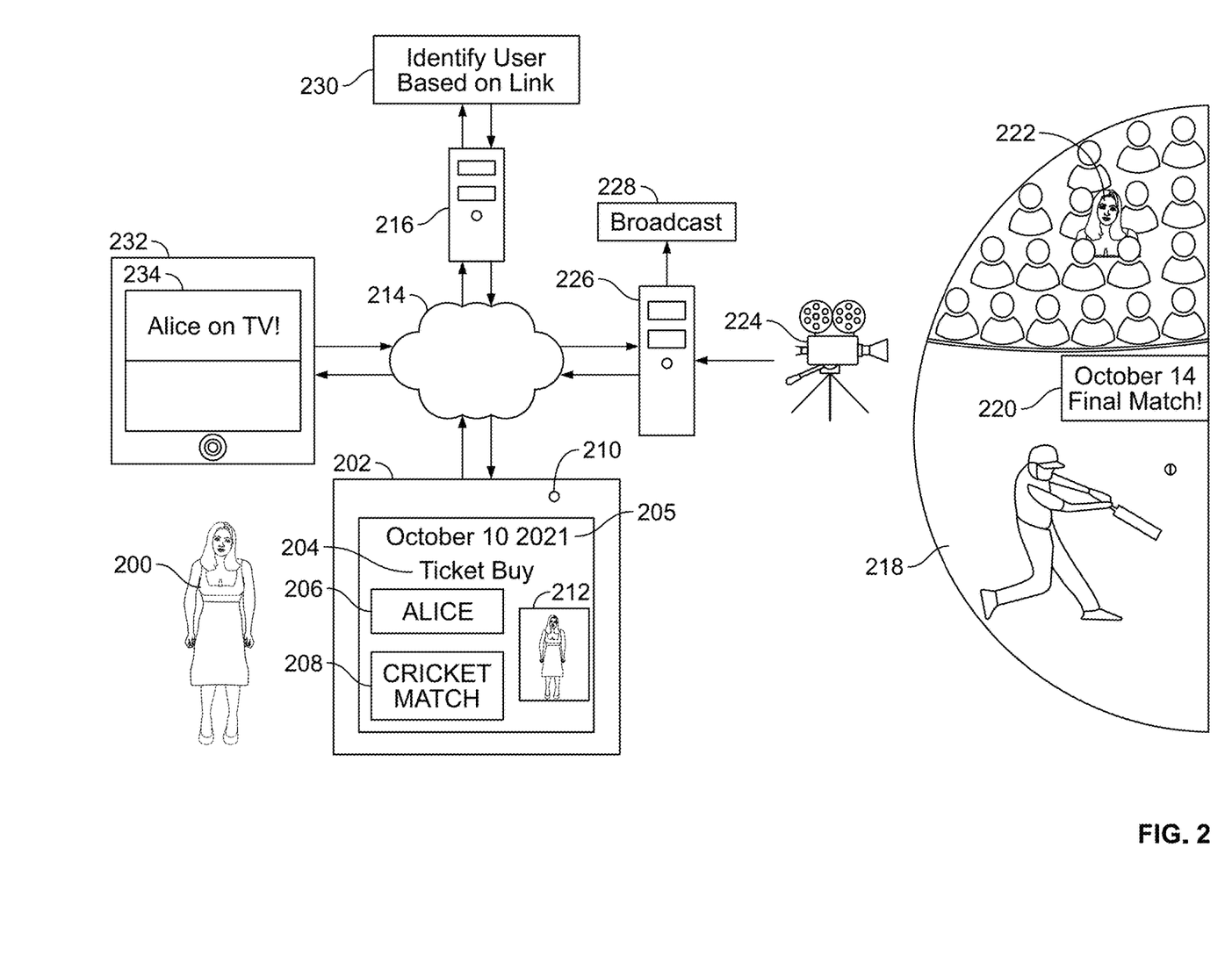
FIG. 2 shows another example environment in which a notification is generated in response to identifying a user in a capture of an event, in accordance with some embodiments of the disclosure.

FIG. 2 shows another example environment in which a notification is generated in response to identifying a user in a capture of an event, in accordance with some embodiments of the disclosure. The environment shown in FIG. 2 is similar to that shown in FIG. 1 and comprises a user 200, a tablet 202, a network 214, a first server 216, an event 218, a video camera 224, a second server 226, and a smartphone 234. Again, the user 200 uses the tablet 202 to visit a website 204, or application, to purchase a ticket for an event on a first date 205, in this example "Oct. 10, 2021." In this example, the user inputs user details, such as their name 206 and the event that they would like to attend 208, in this example, a cricket match. In addition, the user may identify one or more computing devices to receive a notification if they are about to be (or are) present in a broadcast, such as a live broadcast, of the event. Again, the user 200 also uses a camera 210 of the tablet 202 to take a photo 212 of themself, though, as described above, the photo may be received via other means. The user data 206, event data 208 and the photo 212 are transmitted from the tablet 202, via the network 214, such as the internet, to the server 216, where they are stored until the event occurs. The user 200 attends the event 218 at a later date 220, in this example Oct. 14, 2021, and sits in a spectator area 222. The video camera 224 captures the event, and a capture of the event is transmitted, in this example, to the first server 216 and the second server 226. The capture of the event is also broadcast 228 from the second server 226 via, for example, a cable network to multiple computing devices, such as televisions. In some examples, a delay of, for example, five, 15, 20, or 30 seconds may be introduced before the capture is broadcast. During this delay, the capture may be analyzed at the server 216, where it is identified 230 whether the user 200 is present in the capture, based on the information provided at the time of purchasing the ticket, such as, in this example, the photo 212. On identifying the user 200, a notification is generated at the server 216 and is transmitted, via the network 214, to the smartphone 232, that was identified, for example, at the time a ticket to the event was purchased. At the smartphone, notification is generated for display, and the notification 234 is displayed. As described in connection with FIG. 1 above, the notification may not be displayed, and one or more actions may be performed in response to receiving the notification at a computing device.

Figure 3:
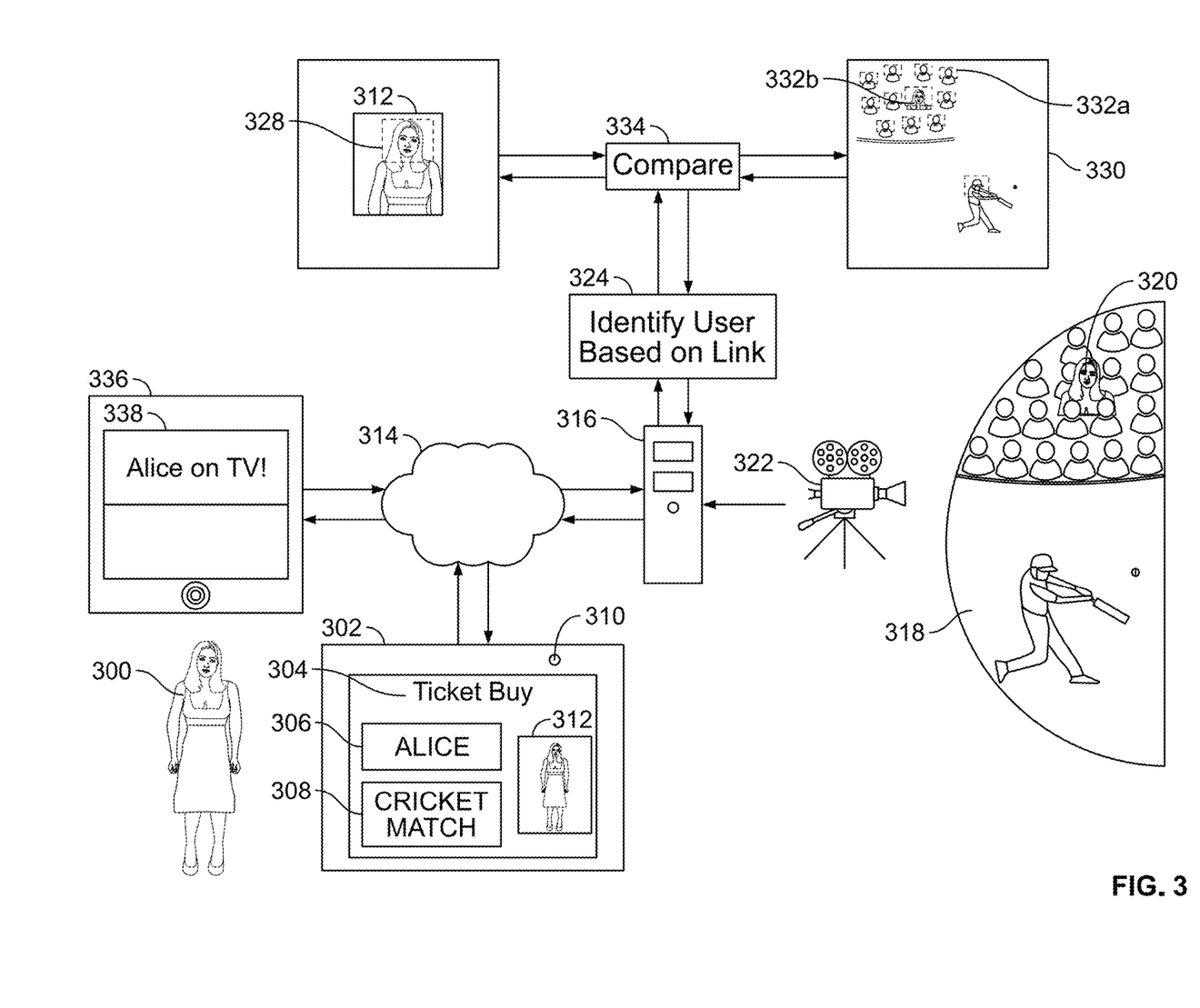
FIG. 3 shows another example environment in which a notification is generated in response to identifying a user in a capture of an event, in accordance with some embodiments of the disclosure.

FIG. 3 shows another example environment in which a notification is generated in response to identifying a user in a capture of an event, in accordance with some embodiments of the disclosure. The environment shown in FIG. 3 is similar to that shown in FIGS. 1 and 2, and comprises a user 300, a tablet 302, a network 314, a server 316, an event 318, a video camera 322, and a smartphone 336. Again, the user 300 uses the tablet 302 to visit a website 304, or application, to purchase a ticket for an event, such as a cricket match. In this example, the user inputs user details, such as their name 306 and the event that they would like to attend 308. In addition, the user may identify one or more computing devices to receive a notification if they are about to be (or are) present in a broadcast, such as a live broadcast, of the event. Again, the user 300 also uses a camera 310 of the tablet 302 to take a photo 312 of themself, though, as described above, the photo may be received via other means. The user data 306, event data 308 and the photo 312 are transmitted from the tablet 302, via the network 314, such as the internet, to the server 316. The user 300 attends the event 318 and sits in a spectator area 320. The video camera 322 captures the event, and a capture of the event is transmitted, in this example, to the server 316. The capture of the event is also broadcast via, for example, a cable network to multiple computing devices, such as televisions. In some examples, a delay of, for example, five, 15, 20, or 30 seconds may be introduced before the capture is broadcast. During this delay, the capture may be analyzed at the server 316, where it is identified 330 whether the user 300 is present in the capture, based on the provided photo 312.

At the server 316, the provided photo 312 is accessed and a face 328 is identified. At the server 316, a frame 330 of the capture is analyzed to identify any faces 332a, 332b. On identifying one or more faces in the frame 330, the face 328 identified in the photo 312 is compared with the identified faces 332a, 332b in the frame 330 of the capture to determine whether any of the faces is of the user. The comparing may comprise determining a confidence level that the face 328 identified in the photo 312 of the user is the same as a face 332a, 332b, identified in a frame 330 of the capture. This comparing may be performed for all of the frames in the capture of the event. In other examples, only a subset of the captures may be analyzed for faces in order to save computing resources. For example, only intra-prediction frames (I-frames) may be analyzed. In other examples, only every, for example, tenth frame (or any other recurring number of frames) may be analyzed. In other examples, the frames may be analyzed based on a change of entropy of information in a frame. The frames of a capture may be analyzed to identify every user that has provided, for example, a photo of themself. On identifying the user 300, a notification is generated at the server 316 and is transmitted, via the network 314, to the smartphone 336, that was identified, for example, at the time a ticket to the event was purchased. The notification may, for example, only be sent if a confidence level of a match between the photo 312 and a face in the frame 330 is above a threshold level, for example 50%, 60%, 75%, or 95%. At the smartphone, notification is generated for display, and the notification 338 is displayed. As described in connection with FIG. 1 above, the notification may not be displayed, and one or more actions may be performed in response to receiving the notification at a computing device.

Figure 4:
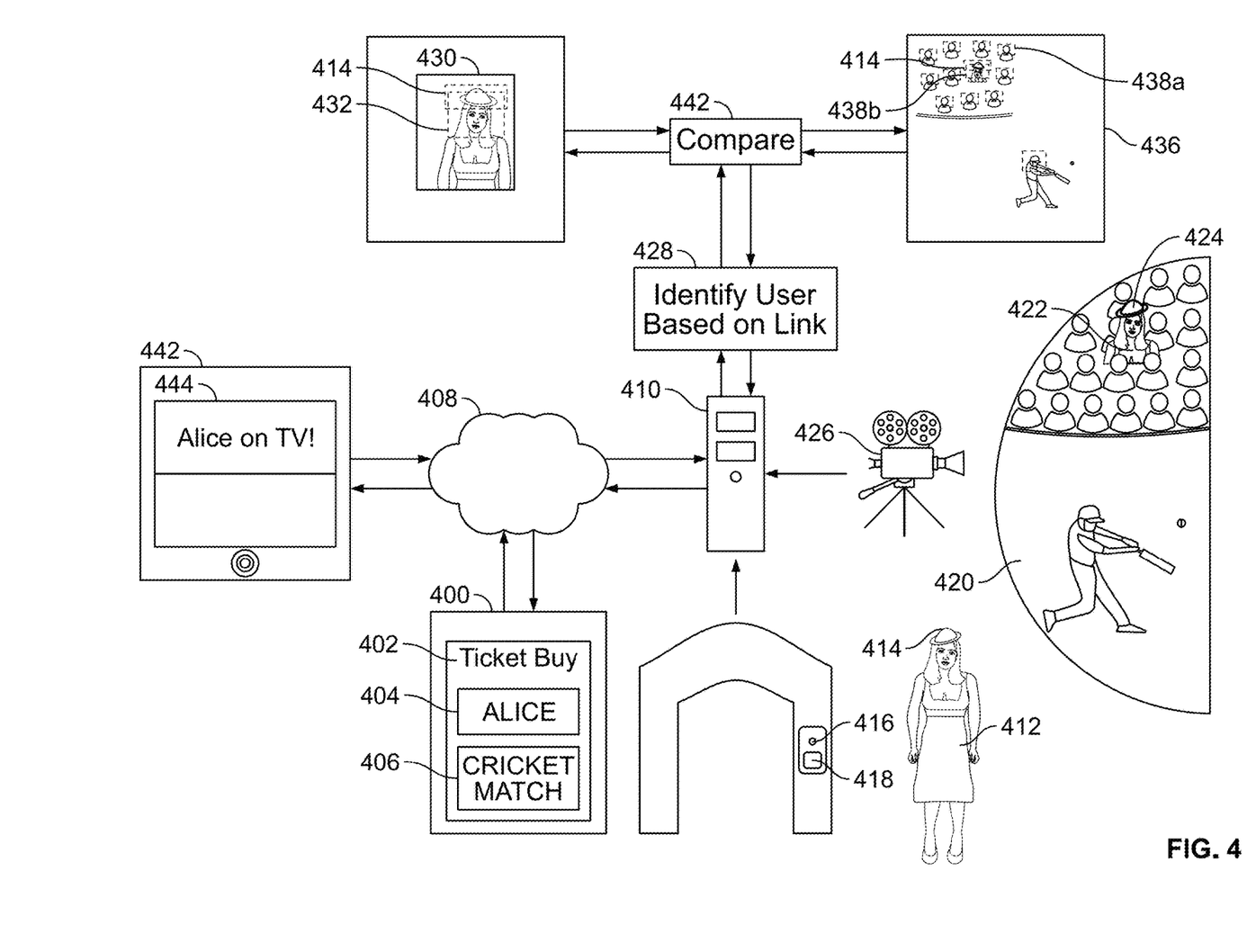
FIG. 4 shows another example environment in which a notification is generated in response to identifying a user in a capture of an event, in accordance with some embodiments of the disclosure.

FIG. 4 shows another example environment in which a notification is generated in response to identifying a user in a capture of an event, in accordance with some embodiments of the disclosure. The environment shown in FIG. 4 is similar to those described above, and comprises a tablet 400, a network 408, a server 410, a user 412, an event 420, a video camera 426, and a smartphone 442. Again, the user 412 uses the tablet 400 to visit a website 402, or application, to purchase a ticket for an event. In this example, the user inputs user details, such as their name 404 and the event that they would like to attend 406, in this example, a cricket match. In addition, the user may identify one or more computing devices to receive a notification if they are about to be (or are) present in a broadcast, such as a live broadcast, of the event. The user data 404 and the event data 406 are transmitted from the tablet 400, via the network 408, such as the internet, to the server 410. The user 412 goes to an entrance associated with the event 420. At the entrance, the user 412 uses a camera 416 to take a photo of themself. In this example, the user is wearing a hat 414. The photo of the user 412 is associated with the user via, for example, a QR code on their ticket, which is scanned at QR code reader 418 at the entrance. In this way, the photo of the user is associated with the user 412. The photo is transmitted to the server 410. As described above, the photo may be received via other means. The user 412 enters the event 420 and sits in a spectator area 422, where they continue to wear the hat 414. The video camera 426 captures the event, and a capture of the event is transmitted, in this example, to the server 410. The capture of the event is also broadcast via, for example, a cable network to multiple computing devices, such as televisions. In some examples, a delay of, for example, five, 15, 20, or 30 seconds may be introduced before the capture is broadcast. During this delay, the capture may be analyzed at the server 410, where it is identified 428 whether the user 412 is present in the capture, based on the provided photo.

At the server 410, the photo 430 that was taken at the entrance to the event is accessed and a face 432 is identified along with the object 414, in this example, the hat 414, and it is identified that the hat 414 is unique, or occurs with a low frequency, amongst the photos received of the spectators. At the server 410, a frame 436 of the capture is analyzed to identify any faces 438a, 438b and any objects, such as the hat 414. On identifying one or more faces in the frame 436 and objects, such as the hat 414, the face 432 and the object 414 identified in the photo 430 are compared with the identified faces 438a, 438b and object 414 in the frame 436 of the capture to determine whether any of the faces 438 are of the user. It may be easier (i.e., use less computing power), for example, to identify the object than a face in the crowd. As such, a frame may first be analyzed to identify the object 414 and, if the object is identified, the frame 436 may be analyzed to identify whether the face 438 of the user(s) associated with the object 414 is also present. In some examples, only a subset set of the frame, for example, a part of the frame proximate to the object, may be analyzed to identify the face 438 of the user. In this way, the amount of computing power required to identify a user in the frame 436 may be reduced. In other examples, the object 414 may be used to improve a confidence level associated with a match. For example, if an initial confidence level of a face match is 40%, but the object is also identified as being associated with the face, then the confidence level may be increased by an amount, for example by 15%. Again, this comparing may be performed for all of the frames in the capture of the event or only a subset of the captures may be analyzed for faces in order to save computing resources. The frames of a capture may be analyzed to identify every user that has provided, for example, a photo of themself. On identifying the user 412, a notification is generated at the server 410 and is transmitted, via the network 408, to the smartphone 442, that was identified, for example, at the time a ticket to the event was purchased. As before, the notification may, for example, only be sent if a confidence level of a match between the photo 430 and a face in the frame 436 is above a threshold level. At the smartphone, notification is generated for display, and the notification 444 is displayed. As described in connection with FIG. 1 above, the notification may not be displayed, and one or more actions may be performed in response to receiving the notification at a computing device.

Figure 5:
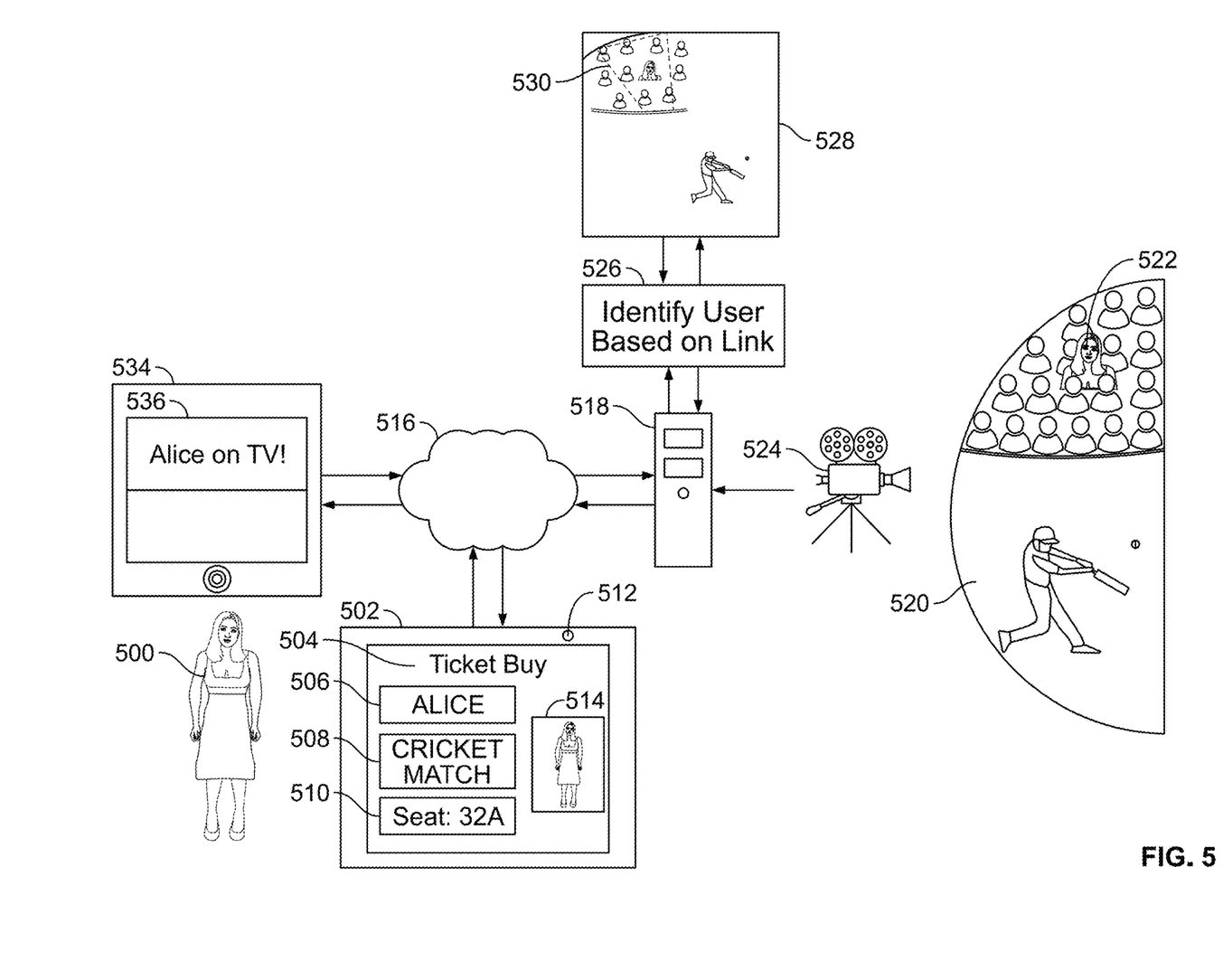
FIG. 5 shows another example environment in which a notification is generated in response to identifying a user in a capture of an event, in accordance with some embodiments of the disclosure.

FIG. 5 shows another example environment in which a notification is generated in response to identifying a user in a capture of an event, in accordance with some embodiments of the disclosure. The environment shown in FIG. 5 is similar to those described above, and comprises a user 500, a tablet 502, a network 516, a server 518, an event 520, a video camera 524, and a smartphone 534. Again, the user 500 uses the tablet 502 to visit a website 504, or application, to purchase a ticket for an event. In this example, the user inputs user details, such as their name 506 and the event that they would like to attend 508, in this example, a cricket match. On inputting these details, the user may be assigned an area of the event in which to sit, for example via a seat number 510. In addition, the user may identify one or more computing devices to receive a notification if they are about to be (or are) present in a broadcast, such as a live broadcast, of the event. Again, the user 500 also uses a camera 512 of the tablet 502 to take a photo 514 of themself, though, as described above, the photo may be received via other means. The user data 506, event data 508 and the photo 514 are transmitted from the tablet 502, via the network 516, such as the internet, to the server 518, where it is stored. The user 500 attends the event 520 and sits in their seat in a spectator area 522. The video camera 524 captures the event, and a capture of the event is transmitted, in this example, to the first server 518. The capture of the event is also broadcast via, for example, a cable network to multiple computing devices, such as televisions. In some examples, a delay of, for example, five, 15, 20, or 30 seconds may be introduced before the capture is broadcast. During this delay, the capture may be analyzed at the server 518, where it is identified 526 whether the user 500 is present in the capture, based on the information provided at the time of purchasing the ticket, such as, in this example, the photo 514. In addition, the portion 530 of the spectator area in the frame 528 of the capture is taken into account. For example, if it is identified that seat numbers 25A-35G are the only seats in the capture, then the frame 528 is only analyzed to determine whether there is a match for any of the faces of the users with those seat numbers assigned to them. In this way, the computer processing power associated with matching a user's face is reduced, because only a subset of all available users are considered as potential matches. On identifying the user 500, a notification is generated at the server 518 and is transmitted, via the network 516, to the smartphone 534, that was identified, for example, at the time a ticket to the event was purchased. At the smartphone, notification is generated for display, and the notification 536 is displayed. As described in connection with FIG. 1 above, the notification may not be displayed, and one or more actions may be performed in response to receiving the notification at a computing device.

Figure 6:
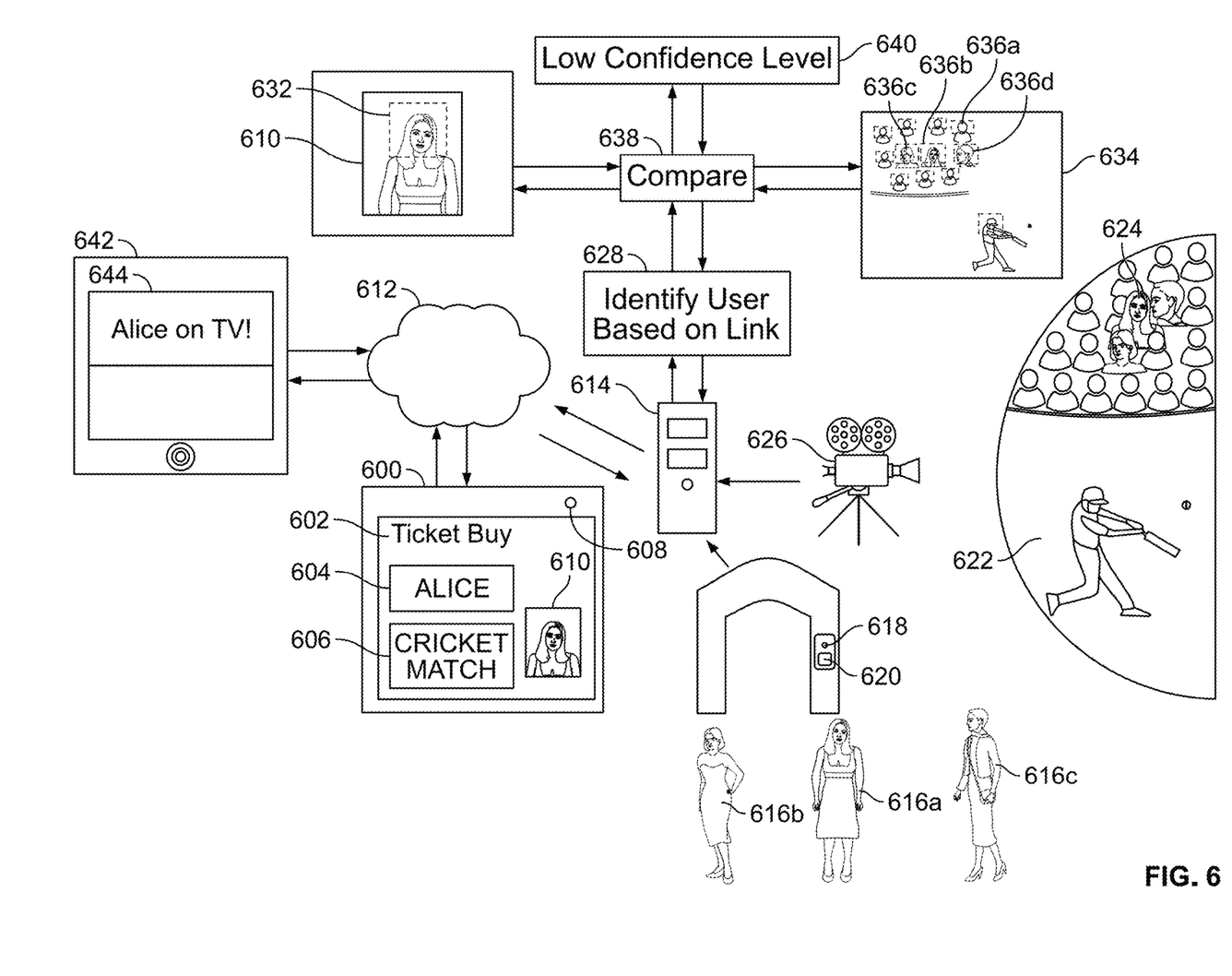
FIG. 6 shows another example environment in which a notification is generated in response to identifying a user in a capture of an event, in accordance with some embodiments of the disclosure.

FIG. 6 shows another example environment in which a notification is generated in response to identifying a user in a capture of an event, in accordance with some embodiments of the disclosure. The environment shown in FIG. 6 is similar to those described above, and comprises a tablet 600, a network 612, a server 614, a user 616a, an event 622, a video camera 626, and a smartphone 642. Again, the user 616a uses the tablet 600 to visit a website 602, or application, to purchase a ticket for an event. In this example, the user inputs user details, such as their name 604 and the event that they would like to attend 606, in this example, a cricket match. Again, the user 600 also uses a camera 608 of the tablet 600 to take a photo 610 of themself, though, as described above, the photo may be received via other means. In addition, the user may identify one or more computing devices to receive a notification if they are about to be (or are) present in a broadcast, such as a live broadcast, of the event. The user data 604, the event data 606 and the photo 610 are transmitted from the tablet 600, via the network 612, such as the internet, to the server 614. The user 616a goes to an entrance associated with the event 622, with, for examples, some friends 616b, 616c. At the entrance, the user 616a uses a camera 618 to take a photo of themself 616a and their friends 616b, 616c. The photo of the user 616a and their friends 616b, 616c is associated with the user 616a via, for example, a QR code on their ticket, which is scanned at QR code reader 620 at the entrance. In this way, the photo of the user 616a and their friends 616b, 616c is associated with the user 616a. The photo is transmitted to the server 614. As described above, the photo may be received via other means. The user 616a and their friends 616b, 616c enter the event 622 and sit in a spectator area 624. The video camera 626 captures the event, and a capture of the event is transmitted, in this example, to the server 614. The capture of the event is also broadcast via, for example, a cable network to multiple computing devices, such as televisions. In some examples, a delay of, for example, five, 15, 20, or 30 seconds may be introduced before the capture is broadcast. During this delay, the capture may be analyzed at the server 614, where it is identified 628 whether the user 616a is present in the capture, based on the provided photo 610.

At the server 614, the photo 610 provided at the time of purchasing a ticket is accessed and a face 632 is identified. At the server 614, a frame 634 of the capture is analyzed to identify any faces 636a, including the face of the user 636b and their friends 636c, 636d. On identifying one or more faces in the frame 634 the face 632 in the photo 610 is compared with the identified faces 636a, 636b, 636c, 636d in the frame 634 of the capture to determine whether any of the faces 636 are of the user 616a. If the user's face 636b is identified in the frame 634 with a low confidence level 640, then the frame may be reanalyzed to identify whether any faces of the friends 616b, 616c associated with the user 616a are proximate to the face 636b identified as being that of the user 616a. The identification is based on the photo taken of the user 616a and their friends 616b, 616c at the entrance to the event. If a user's friend 616b or 616c is identified as being proximate to the face that has been identified as being that of the user with a low confidence level, then the confidence level may be increased based on a user's friend 616b or 616c being proximate to them. Again, this comparing may be performed for all of the frames in the capture of the event, or only a subset of the captures may be analyzed for faces in order to save computing resources. The frames of a capture may be analyzed to identify every user that has provided, for example, a photo of themself. On identifying the user 616a, a notification is generated at the server 614 and is transmitted, via the network 612, to the smartphone 642, that was identified, for example, at the time a ticket to the event was purchased. As before, the notification may, for example, only be sent if a confidence level of a match between the photo 610 and a face in the frame 634 is above a threshold level. At the smartphone, notification is generated for display, and the notification 644 is displayed. As described in connection with FIG. 1 above, the notification may not be displayed, and one or more actions may be performed in response to receiving the notification at a computing device.

Figure 7:
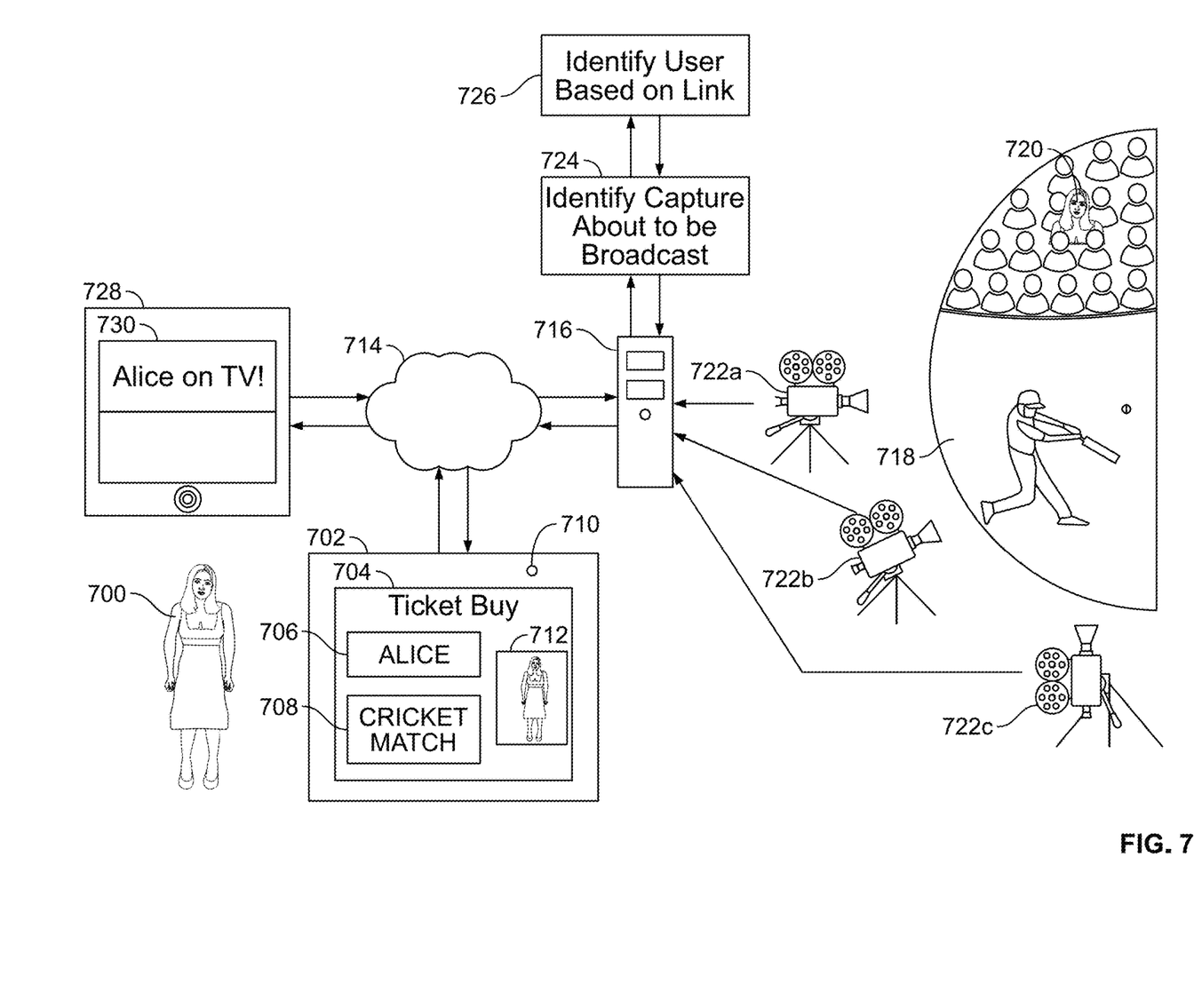
FIG. 7 shows another example environment in which a notification is generated in response to identifying a user in a capture of an event, in accordance with some embodiments of the disclosure.

FIG. 7 shows another example environment in which a notification is generated in response to identifying a user in a capture of an event, in accordance with some embodiments of the disclosure. The environment shown in FIG. 7 is similar to those described above, and comprises a user 700, a tablet 702, a network 714, a server 716, an event 720, a smartphone 728 and first, second and third video cameras 722a, 722b, 722c. Again, the user 700 uses the tablet 702 to visit a website 704, or application, to purchase a ticket for an event. In this example, the user inputs user details, such as their name 706 and the event that they would like to attend 708, in this example, a cricket match. In addition, the user may identify one or more computing devices to receive a notification if they are about to be (or are) present in a broadcast, such as a live broadcast, of the event. Again, the user 700 also uses a camera 710 of the tablet 702 to take a photo 712 of themself, though, as described above, the photo may be received via other means. The user data 706, event data 708 and the photo 712 are transmitted from the tablet 702, via the network 714, such as the internet, to the server 716. The user 700 attends the event 718 and sits in their seat in a spectator area 720. First, second and third video cameras 722a, 722b, 722c capture the event, and the captures of the event are transmitted, in this example, to the first server 716. An editor selects portions of the captures to broadcast via, for example, a cable network to multiple computing devices, such as televisions. In some examples, a delay of, for example, five, 15, 20, or 30 seconds may be introduced before the portion of the capture is broadcast. During this delay, the capture may be analyzed at the server 716, where it is identified 724 whether the user 700 is present in the capture, based on the information provided at the time of purchasing the ticket, such as, in this example, the photo 712. In addition, the capture that the editor has identified 724 for broadcast is taken into account. For example, if the editor has identified that a capture from the first video camera 722a will be broadcast, then only that capture is analyzed to identify the user. If the editor indicates that a capture from the second video camera 722b will be broadcast, then only that capture is analyzed to identify the user. In some examples, the editor may indicate a sub-selection of the cameras that may be used to broadcast in the near future, for example, if a participant in an event could move into the path of one of two cameras. In this example, only the captures from the sub-selection of cameras may be analyzed to identify the user. In this way, the computer processing power associated with matching a user's face is reduced, because only a subset of all available captures are analyzed for a face match. On identifying the user 700, a notification is generated at the server 516 and is transmitted, via the network 714, to the smartphone 728, that was identified, for example, at the time a ticket to the event was purchased. At the smartphone, notification is generated for display, and the notification 730 is displayed. As described in connection with FIG. 1 above, the notification may not be displayed, and one or more actions may be performed in response to receiving the notification at a computing device.

Figure 8:
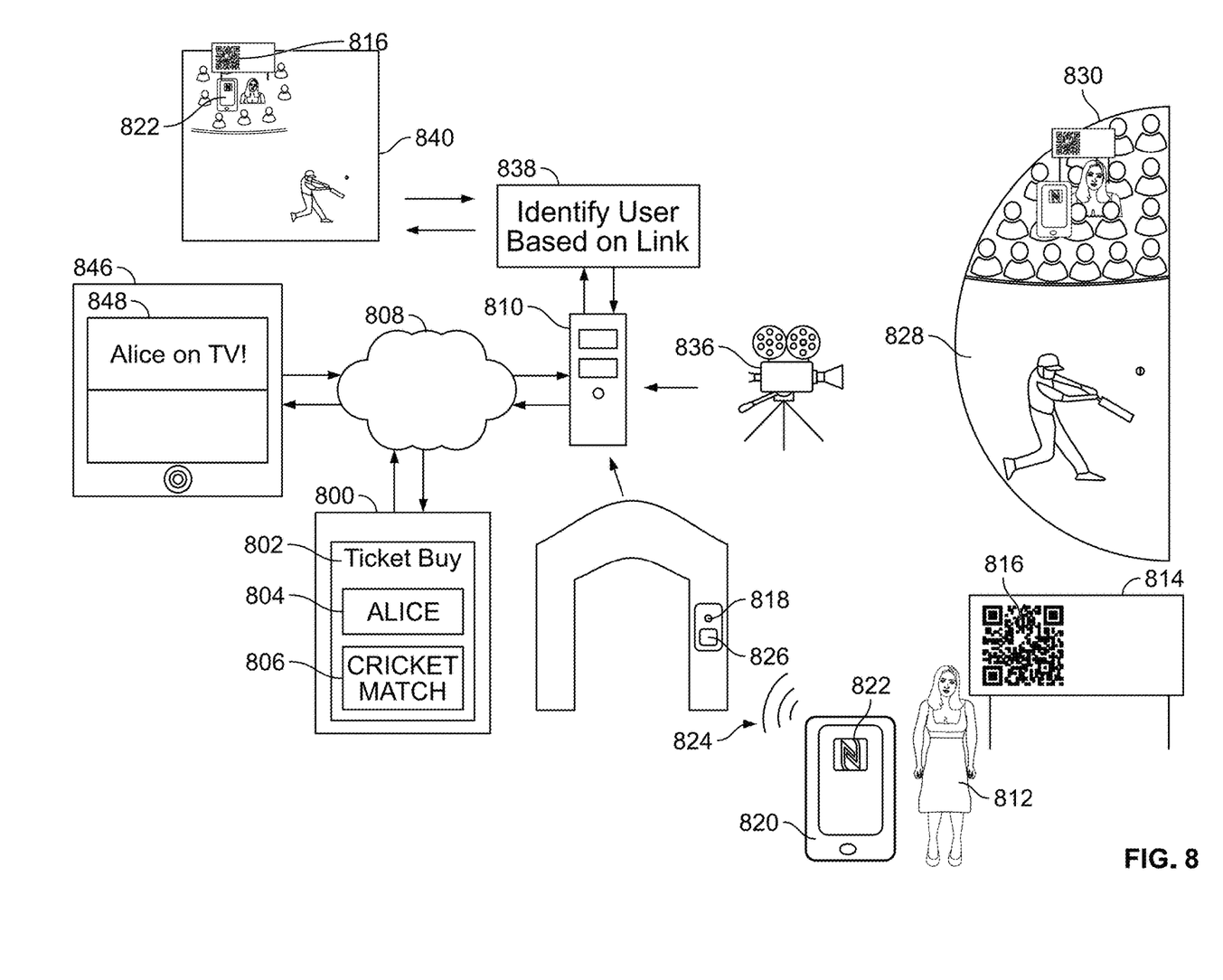
FIG. 8 shows another example environment in which a notification is generated in response to identifying a user in a capture of an event, in accordance with some embodiments of the disclosure.

FIG. 8 shows another example environment in which a notification is generated in response to identifying a user in a capture of an event, in accordance with some embodiments of the disclosure. The environment shown in FIG. 8 is similar to those described above, and comprises a tablet 800, a network 808, a server 810, a user 812, an event 828, a video camera 836, and a smartphone 846. Again, the user 812 uses the tablet 800 to visit a website 802, or application, to purchase a ticket for an event. In this example, the user inputs user details, such as their name 804 and the event that they would like to attend 806, in this example, a cricket match. In addition, the user may identify one or more computing devices to receive a notification if they are about to be (or are) present in a broadcast, such as a live broadcast, of the event. The user data 804 and the event data 806 are transmitted from the tablet 800, via the network 808, such as the internet, to the server 810. The user 812 goes to an entrance associated with the event 828. At the entrance, the user 812 uses a camera 818 to take a photo of themself. In addition, the user registers one or more user tokens via a computing device at the entrance. In this example, the user has a banner 814 which has a QR code 816 on it. The user also registers their smartphone 820 via an NFC connection 822 and a Wi-Fi connection 824, registering, for example, a MAC address of the smartphone 820. These are associated with the user via, for example, a QR code on their ticket, which is read by a QR reader 826 at the entrance. The photo and user tokens are transmitted to the server 810. As described above, the photo may be received via other means. The user 812 enters the event 828 and sits in a spectator area 830. The video camera 836 captures the event, and a capture of the event is transmitted, in this example, to the server 810. The capture of the event is also broadcast via, for example, a cable network to multiple computing devices, such as televisions. In some examples, a delay of, for example, five, 15, 20, or 30 seconds may be introduced before the capture is broadcast. During this delay, the capture may be analyzed at the server 810, where it is identified 838 whether the user 812 is present in the capture, based on the provided photo.

At the server 810, a frame 840 from the capture is accessed. The user token data may be used to identify users that are likely to be in the frame 840. For example, if the QR code that a user registered is identified in the frame, any faces that are identified and are proximate the QR code may first be checked to see if they match with the photo taken of the user 812. In another example, NFC and/or Wi-Fi data may be used to identify users in a certain spectator area. If it is identified that the capture is of that spectator area, then the frame may only be analyzed to see if there are matches with the user (or users) in that area, based on the token data. In this way, a smaller selection of potential faces to be matched are identified, and the amount of computer processing power required to identify a match may be reduced. In other examples, the token data may be used to increase the confidence of a potential facial match. Again, this comparing may be performed for all of the frames in the capture of the event or only a subset of the captures may be analyzed for faces in order to save computing resources. The frames of a capture may be analyzed to identify every user who has provided, for example, a photo of themself. On identifying the user 812, a notification is generated at the server 810 and is transmitted, via the network 808, to the smartphone 846, that was identified, for example, at the time a ticket to the event was purchased. As before, the notification may, for example, only be sent if a confidence level of a match between the photo and a face in the frame 840 is above a threshold level. At the smartphone, notification is generated for display, and the notification 848 is displayed. As described in connection with FIG. 1 above, the notification may not be displayed, and one or more actions may be performed in response to receiving the notification at a computing device.

Figure 9:
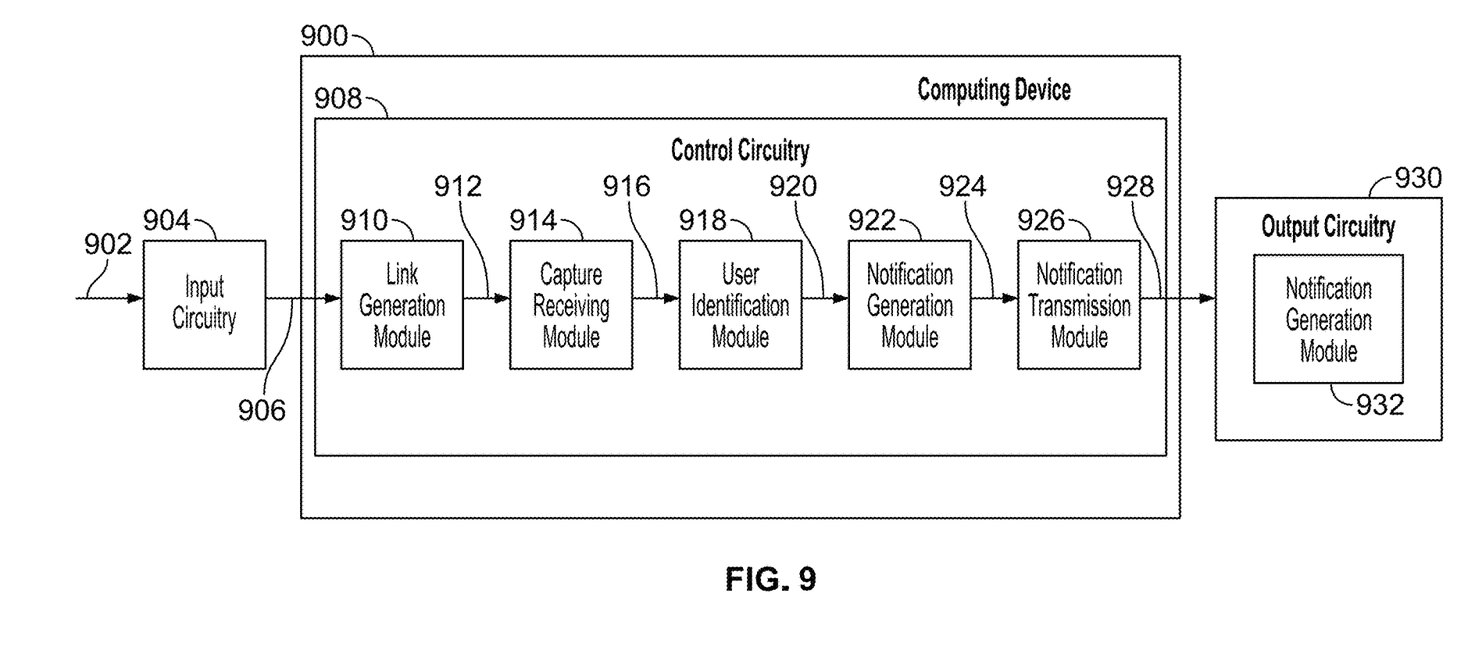
FIG. 9 shows a block diagram representing components of a computing device and data flow therebetween for generating a notification in response to identifying a user in a capture of an event, in accordance with some embodiments of the disclosure.

FIG. 9 shows a block diagram representing components of a computing device and data flow therebetween for generating a notification in response to identifying a user in a capture of an event, in accordance with some embodiments of the disclosure. Computing device 900 (e.g., a server 116, 216, 316, 410, 518, 614, 716, 810) as discussed above comprises input circuitry 904, control circuitry 908 and an output module 930. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 902, which is received by the input circuitry 904. The input circuitry 904 is configured to receive a user input related to a computing device. For example, this may be via a touchscreen, keyboard, mouse, microphone, infra-red controller, Bluetooth controller and/or Wi-Fi controller of the computing device 900. This input may be received via a second computing device, and the input may be transmitted from the second computing device to the computing device 900 via a network, such as the internet. The input circuitry 904 transmits 906 the user input to the control circuitry 908.

The control circuitry 908 comprises a link generation module 910, a capture receiving module 914, a user identification module 918, a notification generation module 922, and a notification transmission module 926. The user input is transmitted 906 to the link generation module 910. At the link generation module 910, a link between a user and an event is generated. On generating the link, an indication is transmitted 912 to the capture receiving module 914, where a capture of an event is received via, for example, the internet. The link between the user and the event and the capture are transmitted 916 to the user identification module 918, where a user is identified in the capture. On identifying a user, an indication of the identified user and the event is transmitted 920 to the notification generation module 922, where a notification is generated. The generated notification is transmitted 924 to the notification transmission module 926, where the notification is transmitted 928, via a network such as the internet, to a third computing device. At the third computing device, there is output circuitry 930. At the output circuitry 930, the notification generation module 932 receives the notification and generates the notification for output.

Figure 10:
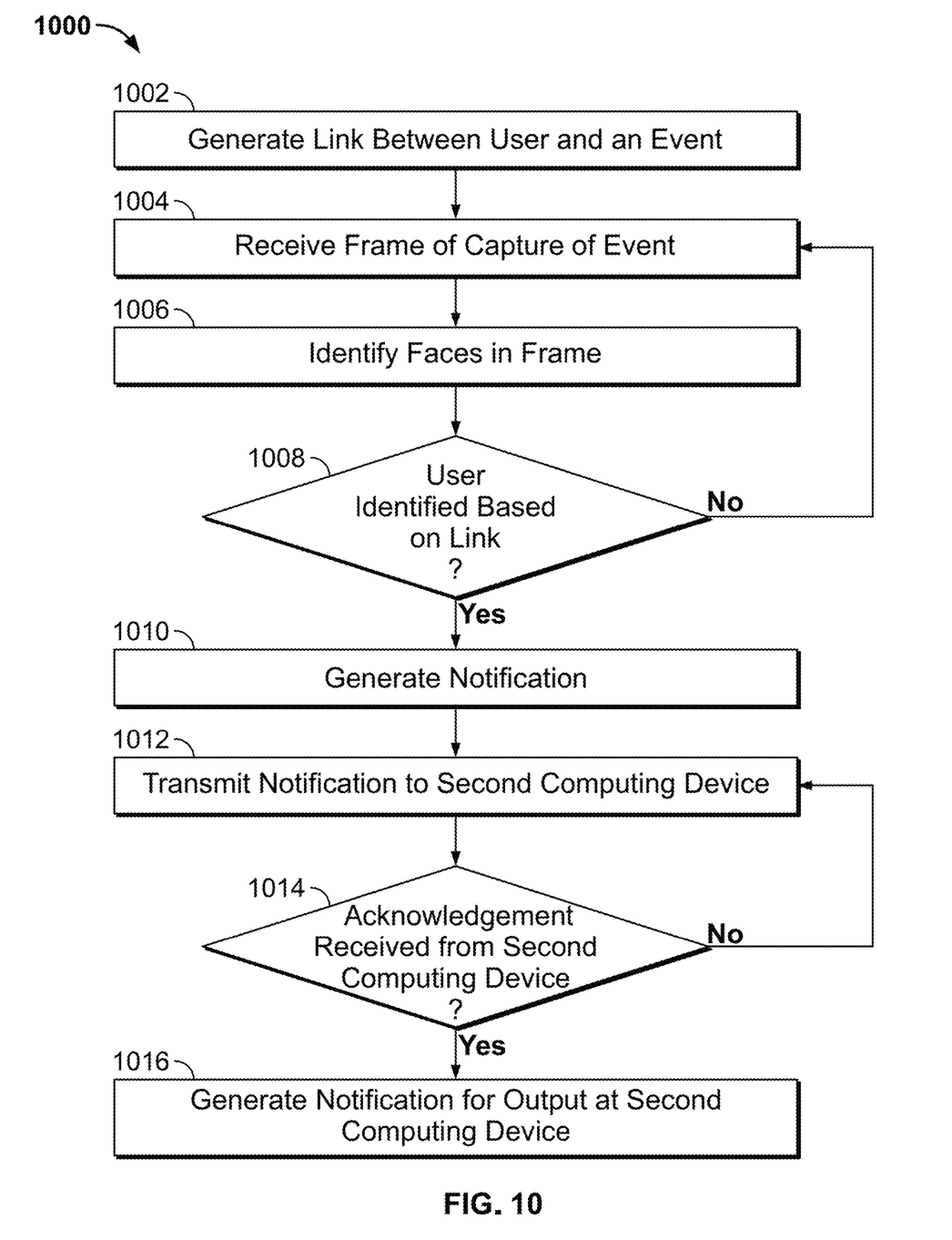
FIG. 10 shows a flowchart of illustrative steps involved in generating a notification in response to identifying a user in a capture of an event, in accordance with some embodiments of the disclosure.

FIG. 10 shows a flowchart of illustrative steps involved in generating a notification in response to identifying a user in a capture of an event, in accordance with some embodiments of the disclosure. Process 1000 may be implemented on any of the aforementioned computing devices (e.g., server 116, 216, 316, 410, 518, 614, 716, 810). In addition, one or more actions of the process 1000 may be incorporated into or combined with one or more actions of any other process or embodiments described herein.

At 1002, a link is generated between a user and an event, and at 1004, a frame of a capture of the event is received. At 1006, faces in the frame are identified, and at 1008 it is determined whether the user has been identified in the frame, based on the link (e.g., a photo of the user). If the user has not been identified, then the next frame is received 1004 and the process loops until the user is identified, or the capture finishes. If the user is identified, then a notification is generated 1010, and transmitted to a second computing device 1012. It is then determined whether an acknowledgement is received from the second computing device 1014. If an acknowledgement is not received from the second computing device after, for example, a threshold amount of time, it is assumed that the second computing device has not received the notification and the notification is transmitted 1012 again. If the second computing device receives the notification, then the notification is generated for output at the second computing device 1016.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating a notification in response to identifying a user in a broadcast video of an event, wherein the broadcast video comprises a plurality of frames, the method comprising:
   accessing a photo of the user;
   receiving, at a first computing device, the broadcast video of the event
   identifying, in the photo, a first face;
   identifying, in a frame of the broadcast video, a second face;
   comparing the first face and the second face;
   identifying, based on the comparing, that the first face and the second face match with a first confidence level that is below a threshold confidence level;
   identifying, in the photo, an object associated with a low occurrence threshold;
   identifying, in the frame of the broadcast video, the object identified in the photo;
   adjusting, based on the identification of the object, the first confidence level to generate a second confidence level;
   identifying that the second confidence level is above the threshold confidence level; and
   generating, based on the second confidence level being above the threshold confidence level, the notification, wherein the notification indicates that the user is in the broadcast video; and
   transmitting the notification to a second computing device.

2. The method of claim 1, wherein the event starts at a first time and the photo of the user is received before the first time.

3. The method of claim 1, wherein the event is a televised event, and the user is a spectator at the event that is being televised.

4. The method of claim 1, wherein the second computing device is identified by the user prior to the start of the event.

5. The method of claim 1, further comprising:
   identifying an area, in the event, where the user is likely to be located; and
   adjusting the first confidence level is further based on identifying the area in the frame of the broadcast video.

6. The method of claim 1, further comprising:
   generating a link between the user and a group of people at the event; and
   adjusting the first confidence level further comprises:
   identifying one or more people of the group of people in the frame of the broadcast video;
   identifying a proximity of the one or more people of the group to the user in the frame of the broadcast video; and
   adjusting the first confidence level based on the proximity of the one or more people of the group of people to the user in the frame of the broadcast video.

7. The method of claim 1, further comprising:
   identifying a personal identification token associated with the user; and
   adjusting the first confidence level is further based on identifying the personal identification token associated with the user in the frame of the broadcast video.

8. The method of claim 1, wherein adjusting the first confidence level is further based on identifying the user via biometric recognition.

9. The method of claim 1, wherein:
   the broadcast video is received at the first computing device at a first time; and
   the broadcast video is broadcast at a second time, wherein the first time is before the second time.

10. A system for generating a notification in response to identifying a user in a broadcast video of an event, wherein the broadcast video comprises a plurality of frames, the system comprising:
    a communication port;
    a memory storing instructions; and
    control circuitry communicably coupled to the memory and the communication port and configured to execute instructions to:
    access a photo of the user;
    receive, at a first computing device, the broadcast video of the event;
    identify, in the photo, a first face;
    identify, in a frame of the broadcast video, a second face;

identify, based on the comparing, that the first face and the second face match with a first confidence level that is below a threshold confidence level;

identify, in the photo, an object associated with a low occurrence threshold;

identify, in the frame of the broadcast video, the object identified in the photo;

adjust, based on the identification of the object, the first confidence level to generate a second confidence level;

identify that the second confidence level is above the threshold confidence level; and generate, based on the second confidence level being above the threshold confidence level, the notification, wherein the notification indicates that the user is in the broadcast video; and transmit the notification to a second computing device.

11. The system of claim 10, wherein the event starts at a first time and the photo of the user is received before the first time.

12. The system of claim 10, wherein the event is a televised event, and the user is a spectator at the event that is being televised.

13. The system of claim 10, wherein the second computing device is identified by the user prior to the start of the event.

14. The system of claim 10, wherein:
the control circuitry configured is further configured to identify an area, in the event, where the user is likely to be located; and
the control circuitry configured to adjust the first confidence level is further configured to adjust the first confidence level based on identifying the area in the frame of the broadcast video.

15. The system of claim 10, wherein:
the control circuitry is further configured to generate a link between the user and a group of people at the event; and
the control circuitry configured to adjust the first confidence level is further configured to:
identify one or more people of the group of people in the frame of the broadcast video;
identify a proximity of the one or more people of the group to the user in the frame of the broadcast video; and
adjust the first confidence level based on the proximity of the one or more people of the group of people to the user in the frame of the broadcast video.

16. The system of claim 10, wherein:
the control circuitry is further configured to identify a personal identification token associated with the user; and
the control circuitry configured to adjust the first confidence level is further configured to identify the user based on identifying the personal identification token associated with the user in the frame of the broadcast video.

17. The system of claim 10, wherein the control circuitry configured to adjust the first confidence level is further configured to identify the user via biometric recognition.

18. The system of claim 10, wherein:
the control circuitry configured to receive the broadcast video is further configured to receive the broadcast video at the first computing device at a first time; and
the control circuitry is further configured to broadcast the broadcast video at a second time, wherein the first time is before the second time.

* * * * *